US011518091B2

(12) United States Patent
Shimoda

(10) Patent No.: US 11,518,091 B2
(45) Date of Patent: Dec. 6, 2022

(54) THREE-DIMENSIONAL SHAPING DEVICE

(71) Applicant: HONDA MOTOR CO., LTD., Tokyo (JP)

(72) Inventor: Akio Shimoda, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 55 days.

(21) Appl. No.: 16/965,234

(22) PCT Filed: Dec. 26, 2018

(86) PCT No.: PCT/JP2018/047721
§ 371 (c)(1),
(2) Date: Jul. 27, 2020

(87) PCT Pub. No.: WO2019/146352
PCT Pub. Date: Aug. 1, 2019

(65) Prior Publication Data
US 2020/0368963 A1 Nov. 26, 2020

(30) Foreign Application Priority Data
Jan. 29, 2018 (JP) .............................. JP2018-012948

(51) Int. Cl.
*B29C 64/153* (2017.01)
*B29C 64/364* (2017.01)
(Continued)

(52) U.S. Cl.
CPC .......... *B29C 64/153* (2017.08); *B29C 64/227* (2017.08); *B29C 64/25* (2017.08);
(Continued)

(58) Field of Classification Search
CPC ... B29C 64/264; B29C 64/268; B29C 64/364; B29C 64/371; B29C 64/25; B22F 12/20;
(Continued)

(56) References Cited

U.S. PATENT DOCUMENTS 9,956,612 B1 * 5/2018 Redding ................ B33Y 10/00
2014/0175708 A1 * 6/2014 Echigo ................ B29C 64/286
264/460

(Continued)

FOREIGN PATENT DOCUMENTS

JP   2014-188758   10/2014
JP   2016-052778    4/2016
JP   2017-203199   11/2017

OTHER PUBLICATIONS

International Search Report, dated Mar. 12, 2019, 1 page.

*Primary Examiner* — Seyed Masoud Malekzadeh
*Assistant Examiner* — Jennifer L Groux
(74) *Attorney, Agent, or Firm* — Rankin, Hill & Clark LLP

(57) ABSTRACT

A three-dimensional shaping device includes a laser irradiation unit (10), a shroud (20), and a protection member (14). The laser irradiation unit includes an optical system (12). The shroud (20) includes an inside space (S0) that extends from one end opening portion (202) to another end opening portion (206). The protection member (14) is formed of a transparent material and is arranged at the one end opening portion (202) of the shroud (20) and causes a laser light emitted from the laser irradiation unit (10) to be transmitted therethrough so that a three-dimensional shaped object is fabricated in a shaping area by sintering or melting and solidifying a powder. The shroud (20) further includes a side wall portion (22) that demarcates a first inside space (S1) and a second inside space (S2), an air supply port (210), an exhaust port (220), and ventilation members (212, 214).

3 Claims, 5 Drawing Sheets

(51) Int. Cl.
*B29C 64/227* (2017.01)
*B29C 64/268* (2017.01)
*B29C 64/25* (2017.01)
*B33Y 30/00* (2015.01)

(52) U.S. Cl.
CPC .......... *B29C 64/268* (2017.08); *B29C 64/364* (2017.08); *B33Y 30/00* (2014.12)

(58) Field of Classification Search
CPC ........ B22F 12/30; B22F 12/32; B22F 12/322; B22F 12/40; B22F 12/41; B22F 12/70; B22F 12/38; B23K 26/12; B23K 26/14; B23K 26/142; B23K 26/1435; B23K 26/144; B23K 26/16
See application file for complete search history.

(56) References Cited

U.S. PATENT DOCUMENTS

| | | | |
|---|---|---|---|
| 2016/0136731 A1* | 5/2016 | McMurtry | B29C 64/371 419/53 |
| 2017/0128601 A1 | 5/2017 | DeCiccio et al. | |
| 2017/0282245 A1* | 10/2017 | Yasuda | B29C 64/371 |
| 2018/0126650 A1* | 5/2018 | Murphree | B22F 10/20 |
| 2019/0091805 A1* | 3/2019 | Chen | B22F 10/20 |
| 2019/0262901 A1* | 8/2019 | Huebinger | B29C 64/153 |

\* cited by examiner

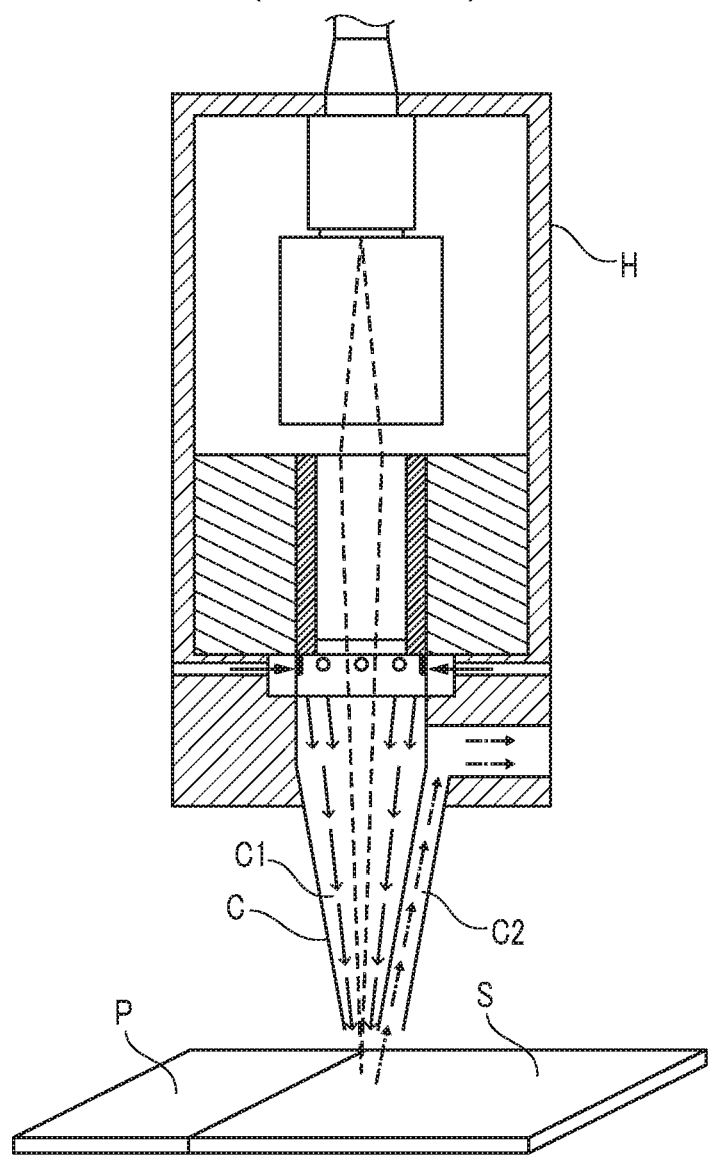

THREE-DIMENSIONAL SHAPING DEVICE

TECHNICAL FIELD

The present invention relates to a three-dimensional shaping device.

BACKGROUND ART

In a three-dimensional shaping device, for example, as illustrated in FIG. 5, a shaped object in a desired shape formed of a laminated body of a plural number of sintered layers S is fabricated by repeating a process of forming a material powder layer P by uniformly sprinkling a material powder onto a shaping table, and forming a sintered layer S by irradiating a predetermined position of the material powder layer P with a laser light (see the broken lines) for sintering (for example, see Patent Literature 1).

It is requested to prevent lowering of the irradiation efficiency of the laser light due to fumes produced in the shaping area in formation of the sintered layer S. Consequently, a cover unit C that opens towards the shaping area has an inactive gas supply cover C1 that discharges inactive gas (see the solid line arrows) through a discharge port to the shaping area and a fume drawing cover C2 that draws inactive gas containing fumes (see the dashed line arrows) through a drawing port. Further, at least one of a position of a holder H that supports the cover unit C and a direction of the cover unit C is controlled in accordance with the irradiation route of the laser light such that the laser light passes through an inside of the inactive gas supply cover C1 and the shaping area is irradiated with the laser light.

CITATION LIST

Patent Literature

Patent Literature 1

Japanese Patent Laid-Open No. 2017-203199

SUMMARY OF INVENTION

Technical Problem

However, in a case where the inactive gas discharged towards the shaping area through the discharge port of the inactive gas supply cover C1 blows up a portion of the powder of the powder layer P that is present in the shaping area, lowering of the quality of the shaped object possibly occurs such as formation of a defect in the shaped object formed by laminating the sintered layers S of the powder. Particularly, this problem becomes significant in a case where the inactive gas supply cover C1 is formed to be gradually narrower towards the discharge port, as illustrated in FIG. 5.

Consequently, an object of the present invention is to provide a three-dimensional shaping device that may avoid lowering of the irradiation efficiency of a laser light due to fumes and so forth while avoiding lowering of the quality of a shaped object.

Solution to Problem

The present invention relates to a three-dimensional shaping device including a laser irradiation unit that has an optical system, a shroud that has an inside space extending from a one end opening portion to an other end opening portion, and a protection member that is arranged at the one end opening portion of the shroud, and, while causing a laser light emitted from the laser irradiation unit to be transmitted through the inside space of the shroud and to pass through the other end opening portion to an outside space of the shroud, isolates the laser irradiation unit from the inside space of the shroud, in which a three-dimensional shaped object is fabricated by repeating a process in which a powder layer formed in a shaping area is irradiated with the laser light emitted from the laser irradiation unit through the inside space of the shroud, while an irradiation position is changed by a driving mechanism, so as to sinter or melt-solidify a powder that constitutes the powder layer.

In the three-dimensional shaping device of the present invention, the shroud includes a side wall portion that demarcates the inside space and has a first inside space, and a second inside space that are mutually independent in an inside, an air supply port for supplying air to the first inside space, and an exhaust port for exhausting air from the second inside space, in which a part of the side wall portion is configured by a first ventilation member made of a mesh or a porous body that partitions the first inside space and the inside space of the shroud, and by a second ventilation member made of a mesh or a porous body that partitions the inside space of the shroud and the second inside space.

In the three-dimensional shaping device thus structured, the process is repeated in which the powder layer formed in the shaping area is irradiated with the laser light emitted from the laser irradiation unit through the inside space of the shroud, while the irradiation position is changed by a driving mechanism, so as to sinter or melt and solidify a powder that constitutes the powder layer. Accordingly, a three-dimensional shaped object in a desired shape is obtained.

Here, inert gas is supplied from an outside of the shroud through the air supply port to the first inside space in an inside of the side wall portion of the shroud, and flows into the inside space demarcated by the side wall portion through the first ventilation member. The inert gas containing fumes that is present in the inside space of the shroud flows into the second inside space in an inside of the side wall portion of the shroud through the second ventilation member, and is exhausted from the second inside space to the outside of the shroud via the exhaust port.

Thereby, in the inside space of the shroud, an air flow of the inert gas is formed that flows from the first ventilation member forming a portion of the side wall portion of the shroud to the second ventilation member forming the other portion of the side wall portion of the shroud, and since the velocity of the air flow is mainly composed of a component in the direction parallel to the powder layer, blowing up or scattering of the powder that constitutes the powder layer is prevented. Accordingly, a situation such as an occurrence of a defect in a shaped object is avoided, and lowering of the quality of the shaped object is thus prevented.

It is preferable that at least one of a mesh opening and an opening ratio of a mesh constituting the second ventilation member is greater than at least one of a mesh opening and an opening ratio of a mesh constituting the first ventilation member, or at least one of an average pore size and a porosity of a porous body constituting the second ventilation member is greater than at least one of an average pore size and a porosity of a porous body constituting the first ventilation member.

In the three-dimensional shaping device thus structured, when the inert gas containing fumes flows from the inside space of the shroud through the openings of the mesh or the pores of the porous body, which constitutes the second ventilation member, to the second inside space of the side wall portion, an amount of the fumes adhered to the second ventilation member can be reduced, and thus the frequency of maintenance and replacement of the second ventilation member can be reduced.

It is preferable that at least one ventilation member of the first ventilation member and the second ventilation member is configured to be intermittently or continuously lower in ventilation from the one end opening portion to the other end opening portion of the shroud.

In the three-dimensional shaping device thus structured, the flow velocity of the inactive gas that flows from the first ventilation member to the second ventilation member in the inside space of the shroud can be continuously or intermittently lower in the direction from the one end opening portion to the other end opening portion of the shroud. Accordingly, blowing up or scattering of the powder that constitutes the powder layer is prevented further reliably in an area close to the other end opening portion of the shroud.

It is preferable that at least one ventilation member of the first ventilation member and the second ventilation member is configured to be intermittently or continuously lower, from the one end opening portion to the other end opening portion of the shroud, in at least one of the mesh opening and the opening ratio of the mesh or at least one of the average pore size and the porosity of the porous body.

In the three-dimensional shaping device thus structured, the flow velocity of the inactive gas that flows from the first ventilation member to the second ventilation member in the inside space of the shroud can be continuously or intermittently lower in the direction from the one end opening portion to the other end opening portion of the shroud. Accordingly, blowing up or scattering of the powder that constitutes the powder layer is prevented further reliably in an area close to the other end opening portion of the shroud.

BRIEF DESCRIPTION OF DRAWINGS

FIG. 5 is an explanatory diagram related to a structure of the three-dimensional shaping device in a prior art.

DESCRIPTION OF EMBODIMENTS

First Embodiment

Structure

Figure 1:
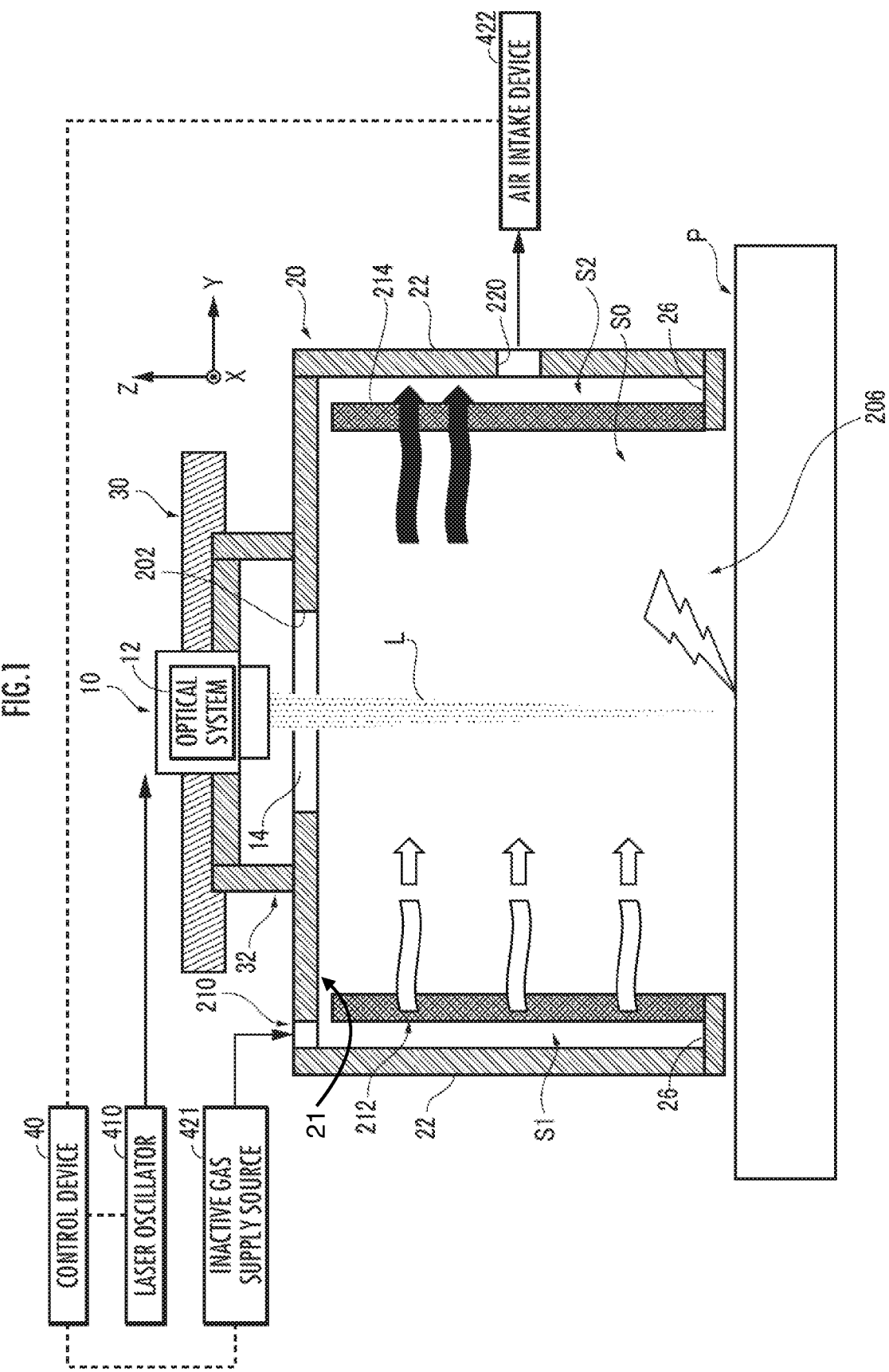
FIG. 1 is an explanatory diagram related to a structure of a three-dimensional shaping device as a first embodiment of the present invention.

A three-dimensional shaping device as a first embodiment of the present invention, which is illustrated in FIG. 1, includes a laser irradiation unit 10, a protection member 14, a shroud 20, and a driving mechanism 30.

The laser irradiation unit 10 has an optical system 12 that is configured with a galvano scanner, for example, and is configured with a galvano mirror, a condenser lens, and so forth. The laser irradiation unit 10 is configured to irradiate an outside, via the optical system 12, with a laser light that is produced by oscillation by a laser oscillator 410 whose operation is controlled by a control device 40.

The shroud 20 is formed into a general tubular shape with a top portion, in which an upper end wall opens in a central portion and a side wall portion 22 has a partial double structure. Specifically, the shroud 20 has a generally tubular-shaped side wall portion 22 that demarcates an inside space $S_0$ extending from a one end opening portion 202 (an upper end opening) to an other end opening portion 206 (a lower end opening) of the shroud 20, and the side wall portion 22 has a first inside space $S_1$ and a second inside space $S_2$ that are mutually independent. Lower end portions of the first inside space $S_1$ and the second inside space $S_2$ are closed by lower end portions 26 of the side wall portion 22, respectively.

Figure 2A:
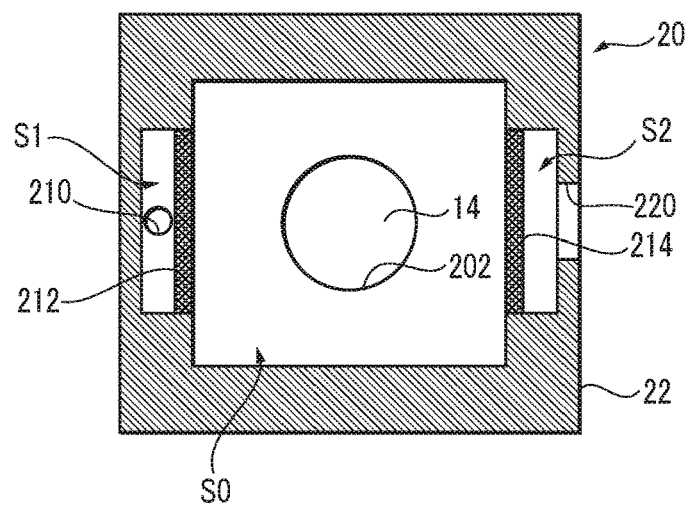
FIG. 2A is an explanatory diagram related to a first example of an arrangement of the first and second inside spaces.
Figure 2B:
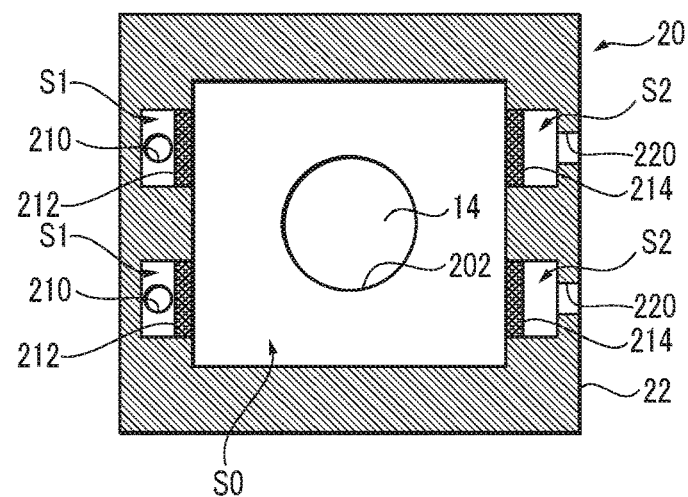
FIG. 2B is an explanatory diagram related to a second example of the arrangement of the first and second inside spaces.
Figure 2C:
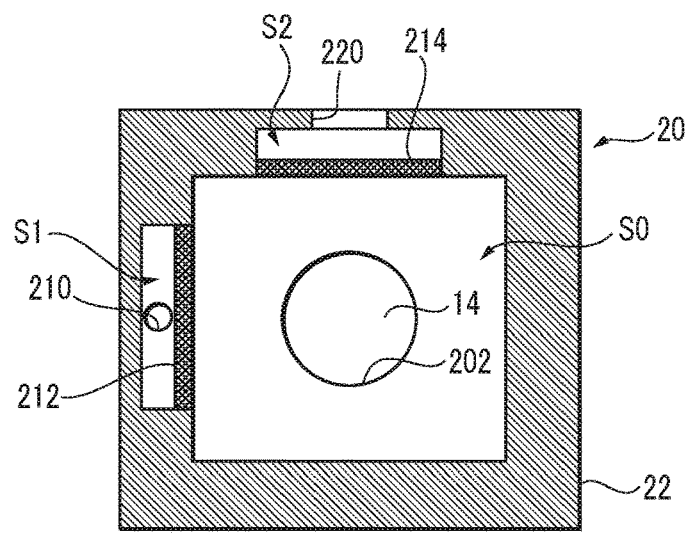
FIG. 2C is an explanatory diagram related to a third example of the arrangement of the first and second inside spaces.

The number, shape, size, position, and attitude of each of the first inside space $S_1$ and the second inside space $S_2$ in an inside of the side wall. portion 22 may be changed in various ways. For example, as illustrated in FIG. 2A, each of a singularity of the first inside space $S_1$ and a singularity of the second inside space $S_2$ may be provided to each of a pair of side portions facing each other of the side wall portion 22 in a substantially rectangular tubular shape. As illustrated in FIG. 29, each of a pair of (a plurality of) the singular first inside spaces $S_1$ and a pair of (a plurality of) the singular inside spaces $S_2$ may be provided to each of a pair of side portions facing each other of the side wall portion 22 in a substantially rectangular tubular shape. As illustrated in FIG. 2C, each of a singularity of the first inside space $S_1$ and a singularity of the second inside space $S_2$ may be provided to each of a pair of side portions not facing each other but adjacent to each other of the side wall portion 22 in a substantially rectangular tubular shape.

Figure 3A:
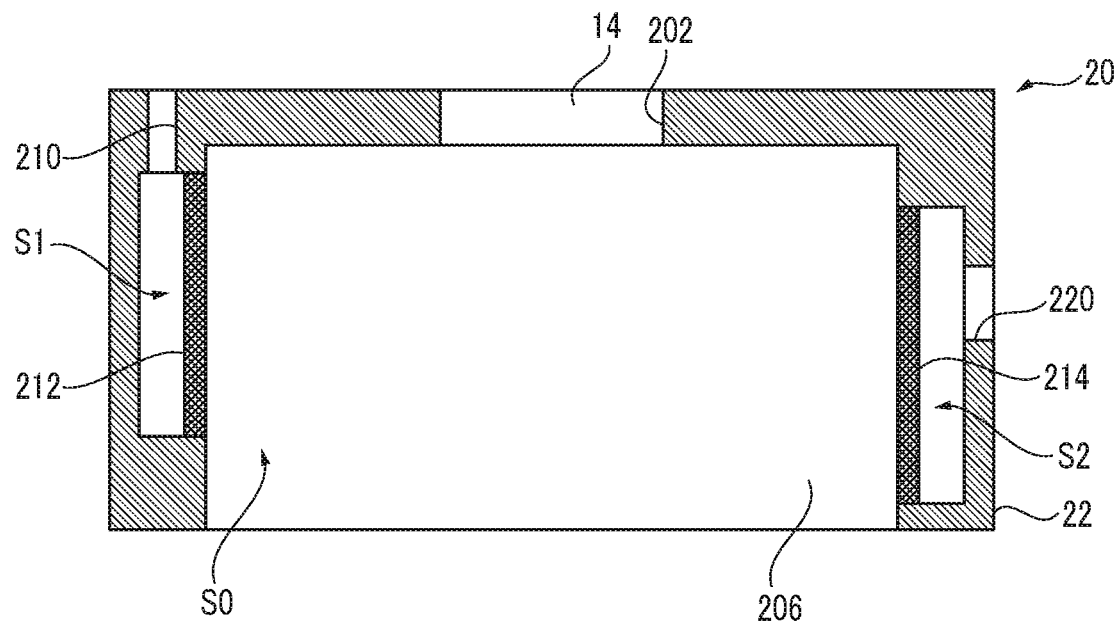
FIG. 3A is an explanatory diagram related to a fourth example of the arrangement of the first and second inside spaces.
Figure 3B:
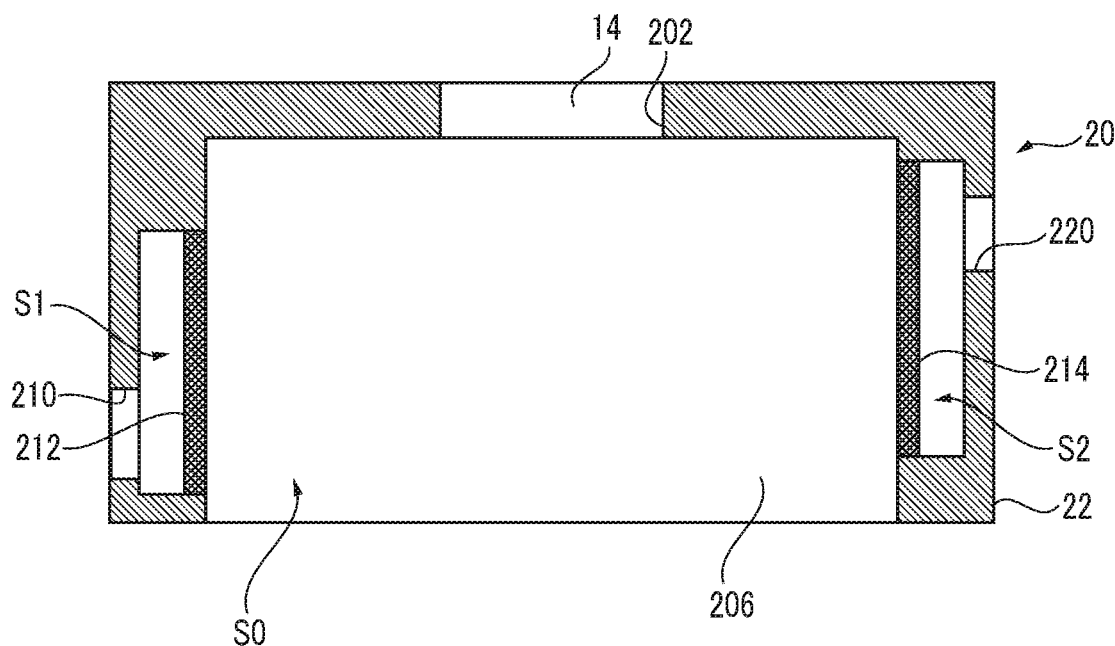
FIG. 3B is an explanatory diagram related to a fifth example of the arrangement of the first and second inside spaces.

As shown in FIG. 3A, each of an upper end position and a lower end position of the first inside space $S_1$ may be positioned above each of an upper end position and a lower end position of the second inside space $S_2$. As shown in FIG. 3B, each of an upper end position and a lower end position of the first inside space $S_1$ may be positioned below each of an upper end position and a lower end position of the second inside space $S_2$. While the upper end position of the first inside space $S_1$ is positioned above the upper end position of the second inside space $S_2$, the lower end position of the first inside space $S_1$ may be positioned below the lower end positions of the second inside space $S_2$. While the upper end position of the first inside space $S_1$ is positioned below the upper end position of the second inside space $S_2$, the lower end position of the first inside space $S_1$ may be positioned above the lower end positions of the second inside space $S_2$.

The shroud 20 includes an air supply port 210 for supplying air to the first inside space $S_1$, which extends downward from an upper surface of the shroud 20 to the first inside space $S_1$. A supply source 421 of inactive gas such as $N_2$ gas is connected with the air supply port 210. For example, an operation of a flow regulation valve (not illustrated) that constitutes the inactive gas supply source 421 is controlled by the control device 40, and the inactive gas (see the outline arrows) is thereby introduced from the inactive gas supply source 421 into the first inside space $S_1$ of the shroud 20 through the air supply port 210 provided to an side partition wall portion 21.

The number, shape, size, position, and attitude (extending form) of the air supply port 210 in the shroud 20 may be changed in various ways. For example, the air supply port 210 may extend horizontally, obliquely upward, or obliquely downward from a side surface of the shroud 20 to the first inside space $S_1$, or may extend obliquely downward from an upper surface of the shroud 20 to the first inside space $S_1$.

The shroud 20 includes an exhaust port 220 that extends inwardly in a lateral direction from a side wall of the shroud 20 to the second inside space $S_2$. An air intake device 422 configured with an air intake pump and so forth is connected with the exhaust port 220. For example, an operation of the air intake device 422 is controlled by the control device 40, and the inactive gas containing fumes (see the black arrows) is thereby led out from the second inside space $S_2$ of the shroud 20 to an outside of the shroud 20 through the exhaust port 220 provided to the side wall portion 22.

The number, shape, size, position, and attitude (extending form) of the exhaust port 220 in the shroud 20 may be changed in various ways. For example, the exhaust port 220 may extend downward or obliquely downward from an upper surface of the shroud 20 to the second inside space $S_2$, or may extend obliquely upward or obliquely downward from a side surface.

A portion of the side wall portion 22 is configured with a first ventilation member 212 that partitions the first inside space $S_1$ and the inside space $S_0$ of the shroud 20 and a second ventilation member 214 that partitions the inside space $S_0$ of the shroud 20 and the second inside space $S_2$. It is preferable that each of the first ventilation member 212 and the second ventilation member 214 is removably attached to the side wall portion 22 by a suitable fixing mechanism such as a clamping mechanism or screwing.

For example, each of the first ventilation member 212 and the second ventilation member 214 is configured with a mesh made of a metal, resin, or a corribination thereof. Further, each of the first ventilation member 212 and the second ventilation member 214 may be configured with a porous body made of a metal, ceramic or a combination thereof.

It is preferable that least one of a mesh opening A and an opening ratio ε of a mesh constituting the second ventilation member 214 is greater than at least one of a mesh opening A and the opening ratio ε of a mesh constituting the first ventilation member 212.

Similarly, it is preferable that at least one of an average pore diameter D and a porosity η of a porous body constituting the second ventilation member 214 is greater than at least one of an average pore diameter D and a porosity η of a porous body constituting the first ventilation merriber 212.

It is preferable that at least one ventilation member of the first ventilation member 212 and the second ventilation member 214 is configured to be intermittently or continuously lower in ventilation from the one end opening portion 202 to the other end opening portion 206 of the shroud 20. For example, at least one of the first ventilation member 212 and the second ventilation member 214 may be configured by combining different meshes such that the mesh opening A and the opening ratio ε of the mesh change over three steps from the one end opening portion 202 to the other end opening portion 206 of the shroud 20. At least one of the first ventilation member 212 and the second ventilation member 214 may be configured by combining different porous bodies such that the average pore diameter D and the porosity η of the porous body change over three steps from the one end opening portion 202 to the other end opening portion 206 of the shroud 20.

The protection member 14 is arranged at the one end opening portion 202 of the shroud 20 such that the laser irradiation unit 10 is isolated from the inside space $S_0$ of the shroud 20. The protection member 14 is formed of a material that has a transparency for a laser light L such as a quartz glass. Accordingly, the protection member 14 enables the laser light L emitted from the laser irradiation unit 10 to be transmitted through the inside space $S_0$ of the shroud 20 and to pass through the other end opening portion 206 to an outside space of the shroud 20.

The driving mechanism 30 is a mechanism for changing an irradiation position of the laser light L emitted from the laser irradiation unit 10 with respect to a powder layer P formed in a shaping area. The driving mechanism 30 is, for example, configured with an XY gantry that supports the laser irradiation unit 10 and supports the shroud 20 below the laser irradiation unit 10 via a support member 32. The laser irradiation unit 10 and the shroud 20 are moved by the XY gantry in two orthogonal directions in parallel with a horizontal direction (X direction and Y direction) without changing relative positions and attitudes. The driving mechanism 30 may be configured with a driving mechanism that adjusts an angle of a gantry mirror that constitutes the optical system 12 of the laser irradiation unit 10. The driving mechanism 30 may have an elevation driving mechanism that displaces the laser irradiation unit 10 and the shroud 20 in a Z direction.

The three-dimensional shaping device may include a powder supply device that supplies a powder to the shaping area and a powder leveling device that forms the powder layer P by leveling the powder (for example, see Japanese Patent No. 6167195), and some or all of the control device 40, the laser oscillator 410, an inactive gas supply device 421, and the air intake device 422, as components.

Action and Effect

In the three-dimensional shaping device as the first embodiment of the present invention, a process is repeated in which the powder layer formed in the shaping area is irradiated with the laser light L emitted from the laser irradiation unit 10 through the inside space $S_0$ of the shroud 20, while the irradiation position is changed by the driving mechanism 30, so as to sinter or melt and solidify a powder that constitutes the powder layer P. Accordingly, a three-dimensional shaped object in a desired shape is obtained.

Here, the inactive gas is introduced through the air supply ports 210 into the first inside space $S_1$ in an inside of the side wall portion 22 of the shroud 20 and flows into the inside space $S_0$ demarcated by the side wall portion 22 through the first ventilation member 212 (see the outline arrows in FIG. 1). The inactive gas containing fumes in the inside space $S_0$ of the shroud 20 flows through the second ventilation member 214 to the second inside space $S_2$ in an inside of the side wall portion 22, and is discharged through the exhaust port 220 from the second inside space $S_2$ to an outside of the shroud 20 (see the black arrows in FIG. 1).

Thereby, in the inside space $S_0$ of the shroud 20, an air flow of the inert gas is formed that flows from the first ventilation member 212 forming a portion of the side wall portion 22 of the shroud 20 to the second ventilation member 214 forming the other portion of the side wall portion 22 of the shroud 20, and the velocity of the air flow is mainly composed of a component in the direction parallel to the powder layer P (see the outline arrows and the black arrows in FIG. 1). Accordingly, blowing up or scattering of the powder that constitutes the powder layer P is prevented, and a situation such as an occurrence of a defect in a shaped object is avoided, and lowering of the quality of the shaped object is thus prevented.

At least one of the mesh opening A and the opening ratio ε of the mesh constituting the second ventilation member 214 is greater than at least one of the mesh opening A and the opening ratio ε of the mesh constituting the first ventilation member 212. Alternatively, at least one of the average pore diameter D and the porosity η of the porous body constituting the second ventilation member 214 is greater than at least one of the average pore diameter D and the porosity of the porous body constituting the first ventilation member 212. In this case, when the inert gas containing fumes flows from the inside space $S_0$ of the shroud 20 into the second inside space $S_2$ of the side wall portion 22 through the openings of the mesh or the pores of the porous body constituting the second ventilation member 214, an amount of fumes attached to the second ventilation member 214 can be reduced, and thus the frequency of maintenance and replacement of the second ventilation member 214 can be reduced.

At least one ventilation member of the first ventilation member 212 and the second ventilation member 214 is configured to be intermittently or continuously lower in ventilation from the one end opening portion 202 to the other end opening portion 206 of the shroud 20. Thereby, the flow velocity of the inert gas flowing from the first ventilation member 212 towards the second ventilation member 214 in the inside space $S_0$ of the shroud 20 can be reduced continuously or intermittently with respect to the direction from the one end opening portion 202 towards the other end opening portion 206 of the shroud 20. Accordingly, in an area close to the other end opening portion 206 of the shroud 20, blowing up or scattering of the powder constituting the powder layer P is further reliably prevented.

Second Embodiment

Structure

Figure 4:
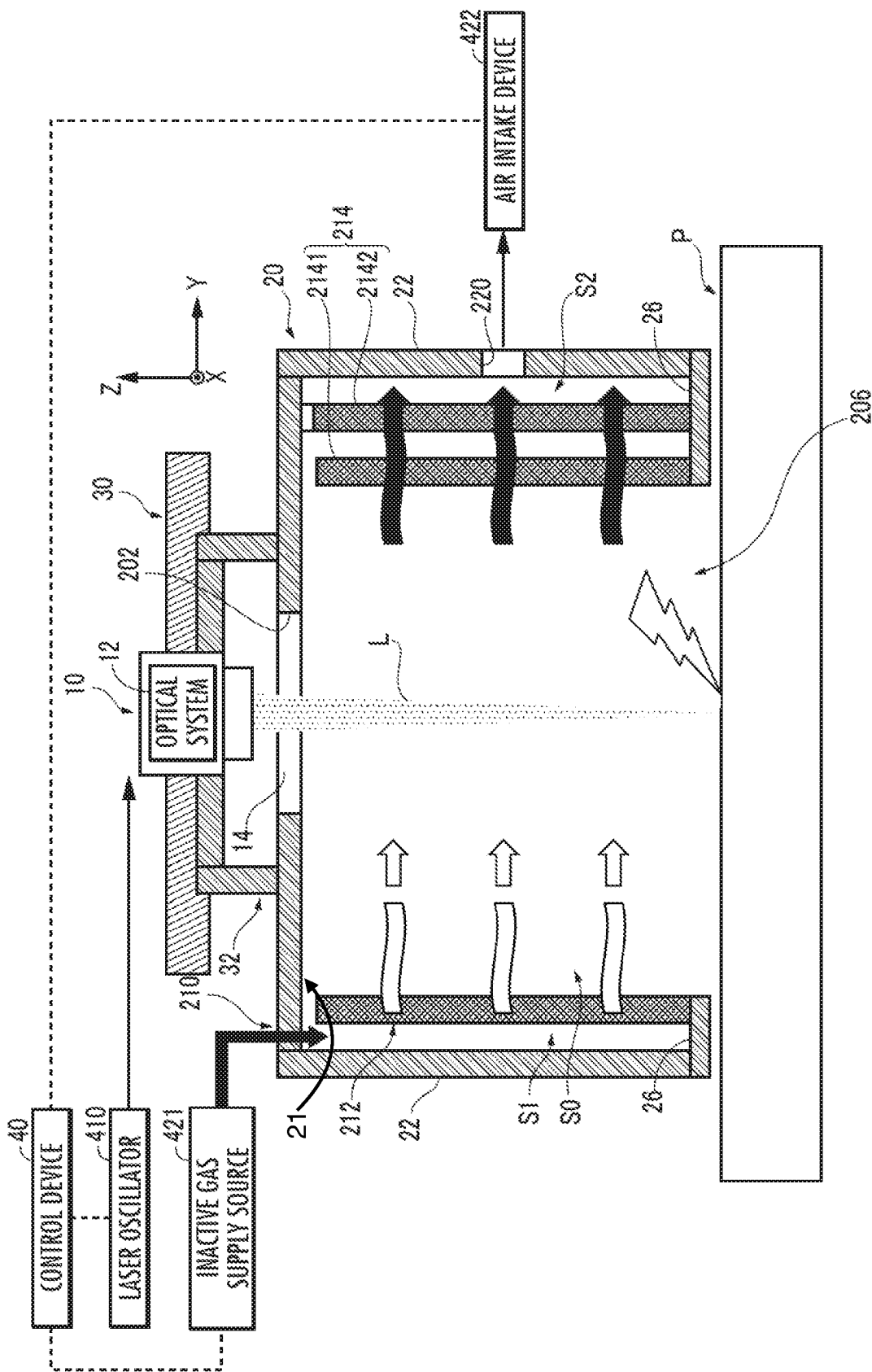
FIG. 4 is an explanatory diagram related to a structure of a three-dimensional shaping device as a second embodiment of the present invention.

In a three-dimensional shaping device as a second embodiment of the present invention illustrated in FIG. 4, the second ventilation member 214 is a ventilation member having a double structure with an inner ventilation member 2141 and an outer ventilation member 2142. Each of the inner ventilation member 2141 and the outer ventilation member 2142 is configured in the same manner as the second ventilation member 214 of the first embodiment. The other elements are configured in the same manner as the three-dimensional shaping device as the first embodiment of the present invention (see FIG. 1, FIGS. 2A to 2C, and FIGS. 3A to 3B). Accordingly, while using the same reference signs for the same structure, description is omitted.

Action and Effect

In the three-dimensional shaping device as the second embodiment of the present invention, in the inside space $S_0$ of the shroud 20, the air flow of the inert gas is formed that flows from the first ventilation member 212 constituting a portion of the side wall portion 22 of the shroud 20 towards the second ventilation member 214 constituting the other portion of the side wall portion 22 of the shroud 20, and the velocity of the air flow is mainly composed of a component in the direction parallel to the powder layer P (See the outline arrows and the black arrows in FIG. 4). Accordingly, blowing-up or scattering of the powder constituting the powder layer P is prevented, a situation such as an occurrence of a defect in a shaped object is avoided, and lowering in the quality of the shaped object is thus prevented.

REFERENCE SIGNS LIST 10 laser irradiation unit
12 optical system
14 protection member
20 shroud
22 side wall portion
30 driving mechanism
40 control device
202 one end opening portion
206 other end opening portion
210 air supply port
212 first ventilation member
214 second ventilation member
220 exhaust port
410 laser oscillator
421 inactive gas supply device
422 drawing device
$S_0$ inside space
$S_1$ first inside space
$S_2$ second inside space

The invention claimed is:

1. A three-dimensional shaping device comprising
a laser irradiation unit that has an optical system,
a shroud that has an inside space extending from one end opening portion to another end opening portion, and
a protection member formed of a transparent material that is arranged at the one end opening portion of the shroud, and, while causing a laser light emitted from the laser irradiation unit to be transmitted through the inside space of the shroud and to pass through the another end opening portion to an outside space of the shroud, isolates the laser irradiation unit from the inside space of the shroud, wherein
a three-dimensional shaped object is fabricated by repeating a process in which a powder layer formed in a shaping area is irradiated with the laser light emitted from the laser irradiation unit through the inside space of the shroud, while an irradiation position is changed by a gantry that supports the laser irradiation unit, so as to sinter or melt and solidify a powder that constitutes the powder layer,
the shroud including a side wall portion that demarcates the inside space, and has a first inside space and a second inside space that are mutually independent in an inside, an air supply port formed on one face of the shroud for supplying air to the first inside space, and an exhaust port formed on another face of the shroud for exhausting air from the second inside space,
the shroud further including a first ventilation member connected to the side wall portion and a second ventilation member connected to the side wall portion, the first ventilation member being made of a mesh or a porous body and partitioning the first inside space and the inside space of the shroud, and the second ventilation member being made of a mesh or a porous body and partitioning the inside space of the shroud and the second inside space, and
at least one ventilation member of the first ventilation member and the second ventilation member is configured to be intermittently or continuously lower in ventilation from the one end opening portion to the another end opening portion of the shroud.

2. The three-dimensional shaping device according to claim 1, wherein
at least one of a mesh opening and an opening ratio of a mesh constituting the second ventilation member is greater than at least one of a mesh opening and an opening ratio of a mesh constituting the first ventilation member, or at least one of an average pore size and a porosity of a porous body constituting the second ventilation member is greater than at least one of an average pore size and a porosity of a porous body constituting the first ventilation member.

3. The three-dimensional shaping device according to claim 1, wherein
the at least one ventilation member of the first ventilation member and the second ventilation member that is configured to be intermittently or continuously lower in ventilation from the one end opening portion to the another end opening portion of the shroud, is configured to be intermittently or continuously lower in ventilation from the one end opening portion to the another end opening portion of the shroud by forming at least one of a mesh opening and an opening ratio of the mesh or at least one of an average pore size and a porosity of the porous body, of said at least one ventilation member of the first ventilation member and the second ventilation member configured to be intermittently or continuously lower in ventilation from the one end opening portion to the another end opening portion of the shroud, to be smaller from the one end opening portion to the another end opening portion of the shroud.

* * * * *